(12) United States Patent
Tamaizumi et al.

(10) Patent No.: US 8,086,373 B2
(45) Date of Patent: Dec. 27, 2011

(54) ELECTRIC POWER STEERING APPARATUS

(75) Inventors: Terutaka Tamaizumi, Okazaki (JP); Yasunori Shintani, Nagoya (JP)

(73) Assignee: JTEKT Corporation, Osaka-shi (JP)

( * ) Notice: Subject to any disclaimer, the term of this patent is extended or adjusted under 35 U.S.C. 154(b) by 304 days.

(21) Appl. No.: 12/435,046

(22) Filed: May 4, 2009

(65) Prior Publication Data
US 2009/0281692 A1 Nov. 12, 2009

(30) Foreign Application Priority Data
May 9, 2008 (JP) .................................. 2008-123418

(51) Int. Cl.
*G06F 19/00* (2011.01)
(52) U.S. Cl. ......................................................... 701/41
(58) Field of Classification Search .................. 701/29, 701/41–43, 63; 180/443, 446
See application file for complete search history.

(56) References Cited

U.S. PATENT DOCUMENTS

| 5,982,137 | A * | 11/1999 | Endo .............................. 318/812 |
| 2005/0150712 | A1 * | 7/2005 | Tokumoto ..................... 180/443 |
| 2007/0162206 | A1 | 7/2007 | Tamaizumi et al. |
| 2008/0167780 | A1 | 7/2008 | Suzuki et al. |
| 2008/0217096 | A1 | 9/2008 | Suzuki et al. |
| 2008/0315809 | A1 | 12/2008 | Tamaizumi |
| 2009/0112405 | A1 | 4/2009 | Tamaizumi et al. |
| 2009/0132126 | A1 | 5/2009 | Tamaizumi |

FOREIGN PATENT DOCUMENTS

| DE | 198 07 024 A1 | 8/1998 |
| DE | 10 2004 060 361 A1 | 7/2005 |
| JP | 2000-185660 | 7/2000 |
| JP | 2004-114755 | 4/2004 |
| JP | 2004-338562 | 12/2004 |

* cited by examiner

*Primary Examiner* — Kim T Nguyen
(74) *Attorney, Agent, or Firm* — Oblon, Spivak, McClelland, Maier & Neustadt, L.L.P.

(57) ABSTRACT

An electric power steering apparatus includes a steering assist section that applies assist force to a steering system of a vehicle to assist operation of a steering wheel performed by a driver. The steering assist section is actuated by a motor. When there is an abnormality in a steering torque sensor, the supply of drive power to the motor is controlled such that a converted steering angle, which is obtained by converting the rotational angle of the motor, follows a target steering angle, which is computed based on the steering angle of the steering wheel by operation performed by the driver.

8 Claims, 4 Drawing Sheets

ELECTRIC POWER STEERING APPARATUS

CROSS-REFERENCE TO RELATED APPLICATIONS

This application is based upon and claims the benefit of priority from prior Japanese Patent Application No. 2008-123418, filed on May 9, 2008, the entire contents of which are incorporated herein by reference.

BACKGROUND OF THE INVENTION

The present invention relates to an electric power steering (EPS) apparatus.

Conventionally, vehicle EPS apparatuses having a motor as a drive source have been known. In such an EPS apparatus, steering torque of a steering wheel transmitted to the steering system of a vehicle is detected by a steering torque sensor. Based on the detected steering torque, computation is executed to obtain a target value of assist force to be applied to the steering system to assist the operation of the steering wheel performed by a driver. The motor is actuated by receiving drive power, and the drive power is controlled in such a manner that the motor generates motor torque that corresponds to the computed target value.

However, when an abnormality occurs in the steering torque sensor, this EPS apparatus can no longer properly assist the steering operation. Accordingly, a technique has been developed in which an alternate target value of assist force is computed based on a steering angle of the steering wheel detected by using a steering angle sensor. When an abnormality occurs in the steering torque sensor, the alternate target value is used in place of the target value computed based on the steering torque.

For example, Japanese Laid-Open Patent Publication No. 2004-338562 discloses a technique in which an assist force target value is computed based on the steering angle and is given a hysteresis characteristic according to the direction in which the steering wheel is being turned. Japanese Laid-Open Patent Publication No. 2004-114755 discloses a technique in which the steering speed is multiplied by a coefficient corresponding to the steering angle to obtain an assist force target value.

However, the assist force target value computed based on the steering angle is merely an alternative to the assist force target value computed based on the steering torque. Without the steering torque sensor, which is an essential part of the feedback loop, it is difficult to continuously assist the steering operation in a stable manner. This is because disturbance such as changes in the road surface condition is likely to influence the steering operation.

SUMMARY OF THE INVENTION

Accordingly, it is an objective of the present invention to provide an electric power steering apparatus that is capable of continuously and stably assist the operation of a steering member performed by a driver, even if an abnormality occurs in a steering torque sensor.

To achieve the foregoing objective and in accordance with one aspect of the present invention, an electric power steering apparatus including a steering assist section, a steering torque sensor, an abnormality detecting section, a steering angle sensor, a rotational angle sensor, and a control section is provided. The steering assist section applies assist force to a steering system to assist operation of a steering member. The steering assist section is actuated by a drive source, and the drive source is a motor. The steering torque sensor detects steering torque input to the steering system. The abnormality detecting section detects an abnormality in the steering torque sensor. The steering angle sensor detects a steering angle of the steering member. The rotational angle sensor detects a rotational angle of the motor. The control section controls supply of drive power to the motor. When the abnormality detection section detects an abnormality in the steering torque sensor, the control section controls the supply of drive power to the motor such that a converted steering angle, which is obtained by converting the rotational angle of the motor detected by the rotational angle sensor, follows a target steering angle, which is computed based on the steering angle detected by the steering angle sensor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 5.

Figure 1:
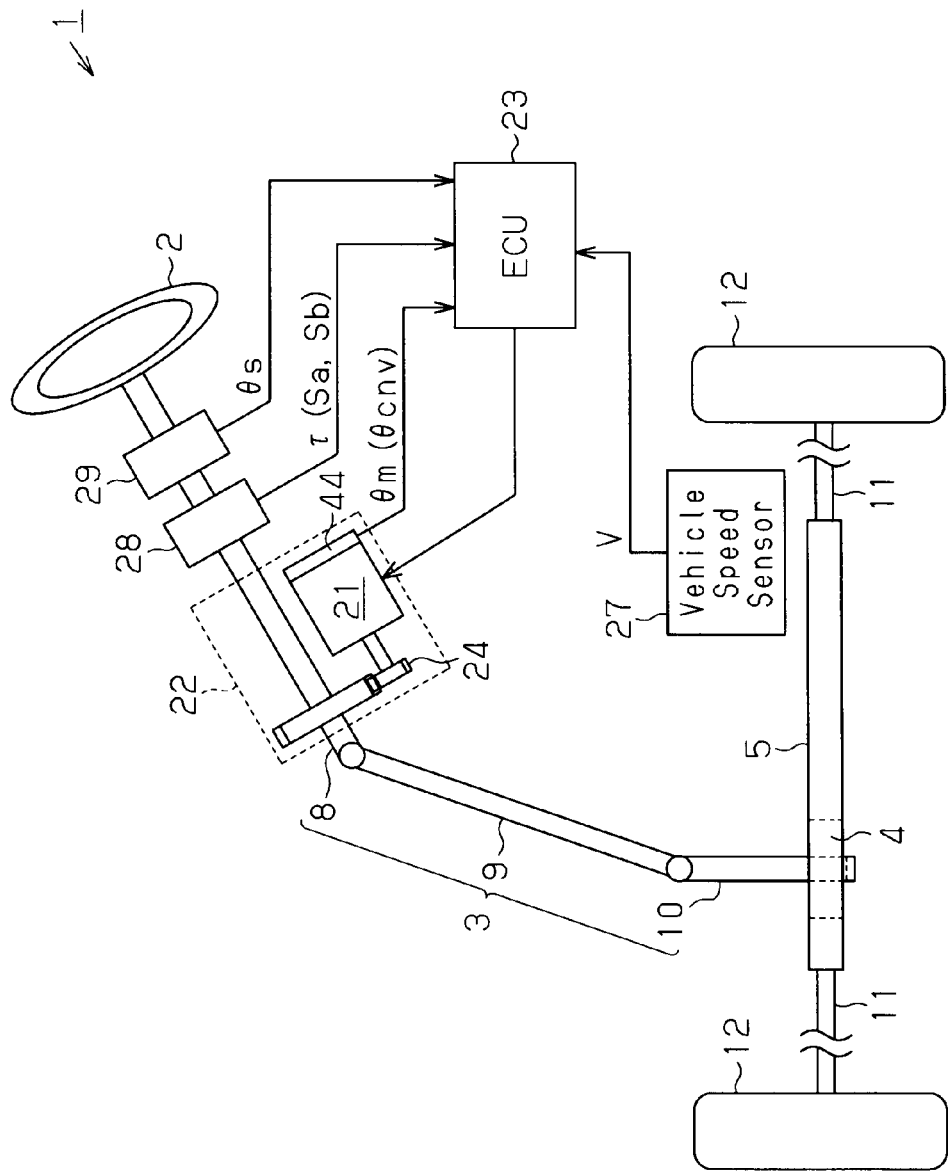
FIG. 1 is a diagrammatic view showing an electric power steering (EPS) apparatus according to one embodiment of the present invention.

As shown in FIG. 1, an electric power steering (EPS) apparatus 1 according to the present embodiment is mounted on a vehicle. In the vehicle, a steering shaft 3 extending from a steering wheel 2, which is a steering member, is coupled to a rack shaft 5 by means of a rack-and-pinion mechanism 4. The steering shaft 3 includes a column shaft 8, an intermediate shaft 9 coupled to the column shaft 8, and a pinion shaft 10 coupled to the intermediate shaft 9. In response to operation of the steering wheel 2 performed by a driver, the steering shaft 3 is rotated. Rotation of the steering shaft 3 is converted into linear reciprocation of the rack shaft 5 by the rack-and-pinion mechanism 4 and then is transmitted to knuckles, which are not shown, via tie rods 11 coupled to both ends of the rack shaft 5. As a result, the steered angle of steerable wheels 12 is changed. That is, a forward moving direction of the vehicle is changed.

The EPS apparatus 1 includes an EPS actuator 22, which serves as a steering assist section, and an ECU 23, which serves as control means (control section). The EPS actuator 22 is driven by a motor 21 and applies assist force to the steering system of the vehicle, thereby assisting the operation of the steering wheel 2 performed by the driver. The ECU 23 controls the supply of drive power to the motor 21, thereby controlling the operation of the EPS actuator 22.

The EPS actuator 22 is a column type EPS actuator in which the motor 21 is operatively coupled to the column shaft 8, with a speed reducer 24 in between. Rotation of the motor 21 is transmitted to the column shaft 8 after being reduced by the speed reducer 24, so that the motor torque, that is, assist force is applied to the steering system.

The ECU 23 is connected to a vehicle speed sensor 27, a steering torque sensor 28, and a steering angle sensor 29. The vehicle speed sensor 27 detects the vehicle speed V. The steering torque sensor 28 detects steering torque τ input to the steering system, that is, the steering torque τ of the steering wheel 2 generated through operation performed by the driver. The steering torque sensor 28 is a twin resolver type torque sensor. A pair of resolvers are provided at ends of a torsion bar (not shown) of the steering torque sensor 28, and the ECU 23 receives resolver output signals Sa, Sb. The steering angle sensor 29 detects a steering angle θs of the steering wheel 2 resulting from operation performed by the driver. The ECU 23 computes a target value of the assist force based on the detected vehicle speed V, steering torque τ, and steering angle θs. The ECU 23 controls the supply of drive power to the motor 21 such that a motor torque corresponding to the target value is generated.

Next, a description will be given of the steering assist by the EPS 1.

Figure 2:
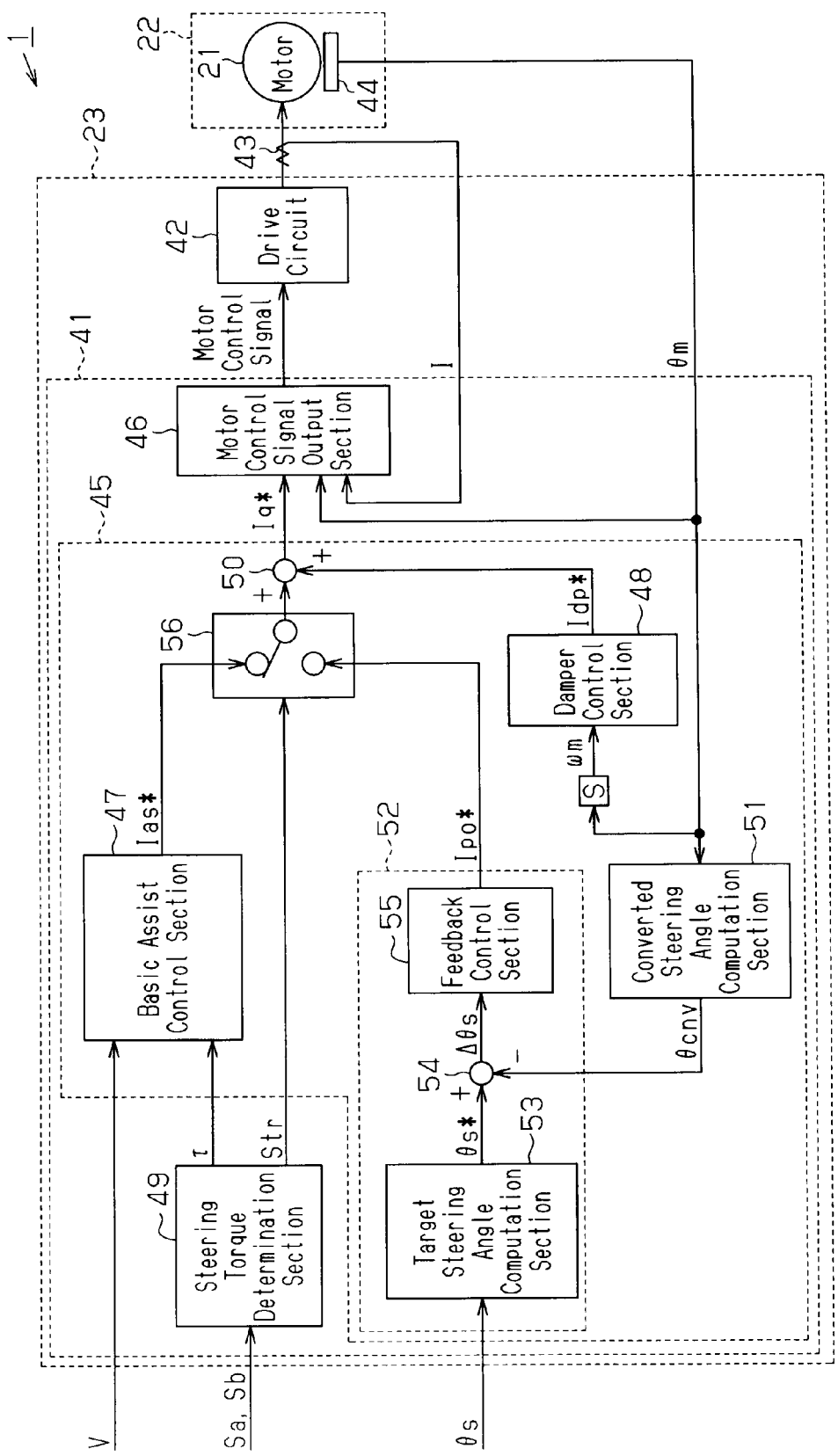
FIG. 2 is a block diagram of the EPS apparatus of FIG. 1.

As shown in FIG. 2, the ECU 23 is provided with a microcomputer 41 and a drive circuit 42, which feeds drive power to the motor 21 in accordance with a motor control signal sent from the microcomputer 41. The ECU 23 is connected to a current sensor 43 and a rotational angle sensor 44. The current sensor 43 detects the value I of the actual current supplied to the motor 21. The rotational angle sensor 44 detects a rotational angle θm of the motor 21. The microcomputer 41 generates a motor control signal based on the actual current value I and the rotational angle θm detected by the sensors 43, 44, in addition to based on the vehicle speed V, the steering torque τ, and the steering angle θs.

The process for generating and outputting a motor control signal described below is realized by a computer program executed by the microcomputer 41. The microcomputer 41 samples the vehicle speed V, the steering torque τ, the steering angle θs, the actual current value I, and t the rotational angle θm at predetermined time intervals, and generates and outputs a motor control signal accordingly.

The microcomputer 41 is provided with a current command value computation section 45 and a motor control signal output section 46. The current command value computation section 45 computes a current command value Iq*, which is a target value of the current supplied to the motor 21. The motor control signal output section 46 generates and outputs a motor control signal based on the current command value Iq* computed by the current command value computation section 45.

The current command value computation section 45 is provided with a basic assist control section 47 and a damper control section 48. The basic assist control section 47 computes a basic assist control amount Ias*, which is a basic component of the target value of the assist force. The damper control section 48 computes a damping compensation amount Idp*, which is a compensation component of the target value of the assist force.

The basic assist control section 47 receives the vehicle speed V and the steering torque τ. The microcomputer 41 has a steering torque determination section 49, which determines the steering torque τ based on the signals Sa, Sb sent from the steering torque sensor 28 and outputs the steering torque τ to the basic assist control section 47. The basic assist control section 47 computes the basic assist control amount Ias* such that the greater the absolute value of the steering torque τ, the greater the assist force applied to the steering system becomes.

The damper control section 48 receives a rotational angular velocity ωm of the motor 21. The damping compensation amount Idp* computed by the damper control section 48 has a value in a direction opposite to the rotational direction of the motor 21, and functions to attenuate the rotational angular velocity ωm. The damper control section 48 computes the damping compensation amount Idp* such that the greater the absolute value of the rotational angular velocity ωm, the greater the amount by which the rotational angular velocity ωm is attenuated becomes.

The basic assist control amount Ias* and the damping compensation amount Idp* are sent to an adder 50. The current command value Iq*, which is sent from the current command value computation section 45 to the motor control signal output section 46, is normally a value obtained by adding the damping compensation amount Idp* to the basic assist control amount Ias* by the adder 50.

In addition to the current command value Iq*, the motor control signal output section 46 receives the actual current value I detected by the current sensor 43 and the rotational angle θm of the motor 21 detected by the rotational angle sensor 44. When generating the motor control signal, the motor control signal output section 46 executes current feedback control so as to cause the actual current value I to follow the current command value Iq*.

The motor 21 is a brushless motor and is rotated by receiving drive power of three phases, or U-phase, V-phase, and W phase. Therefore, the motor control signal output section 46 executes the current feedback control by subjecting the phase current values Iu, Iv, Iw (the actual current value I) detected by the current sensor 43 to d/q conversion, that is, by converting the phase current values Iu, Iv, Iw to a d-axis current value and a q-axis current value on a d/q coordinate system.

The current command value Iq* is a q-axis current command value that functions as a target value of the q-axis current. The motor control signal output section 46 subjects the phase current values Iu, Iv, Iw to d/q conversion based on the rotational angle θm of the motor 21. The motor control signal output section 46 computes a d-axis voltage command value and a q-axis voltage command value based on the d-axis current value, the q-axis current value, and the q-axis current command value. Thereafter, the motor control signal output section 46 computes phase voltage command values Vu*, Vv*, Vw* by d/q inverse conversion of the d-axis voltage command value and the q-axis voltage command value. The motor control signal output section 46 generates a motor control signal based on the phase voltage command values Vu*, Vv*, Vw*.

The thus generated motor control signal is sent from the microcomputer 41 to the drive circuit 42. In response to the motor control signal, the drive circuit 42 supplies the motor 21 with three-phase drive power. As a result, motor torque corresponding to the current command value Iq*, which is based on the steering torque τ, is generated, and assist force is applied to the steering system.

A process for generating a motor control signal when an abnormality occurs in the steering torque sensor 28 will now be described.

As shown in FIG. 2, the current command value computation section 45 is provided with a converted steering angle computation section 51 and a steering angle control section 52. The converted steering angle computation section 51 computes a converted steering angle θcnv by converting the rotational angle θm of the motor 21 detected by the rotational angle sensor 44 to the steering angle θs of the steering wheel 2. The midpoint of the rotational angle sensor 29 and the midpoint of the rotational angle sensor 44 are matched to each other when the ignition switch is turned on, so that twist of the torsion bar of the steering torque sensor 28 is factored in the computation of the converted steering angle θcnv by the converted steering angle computation section 51. The steering angle control section 52 computes a target steering angle θs* based on the steering angle Gs detected by the steering angle sensor 29. The steering angle control section 52 also computes a steering angle control amount Ipo*, which is used for causing the converted steering angle θcnv to follow the computed target steering angle θs*. When an abnormality in the steering torque sensor 28 is detected, the current command value computation section 45 executes computation of the current command value Iq* in which the steering angle control amount Ipo* computed by the steering angle control section 52 is used as the basic component, instead of executing the computation of the current command value Iq* in which the basic assist control amount Ias* is used as the basic component.

That is, when no abnormality in the steering torque sensor 28 is detected, the ECU 23 controls the drive power supplied to the motor 21 to generate motor torque that corresponds to the target value of the assist force computed based on the steering torque τ. When an abnormality in the steering torque sensor 28 is detected, the ECU 23 controls the drive power supplied to the motor 21 such that the rotation of the motor 21 follows the rotation of the steering wheel 2 due to the operation performed by the driver. Therefore, even if an abnormality occurs in the steering torque sensor 28, the operation of the steering wheel 2 by the drive is continuously and stably assisted.

Figure 3:
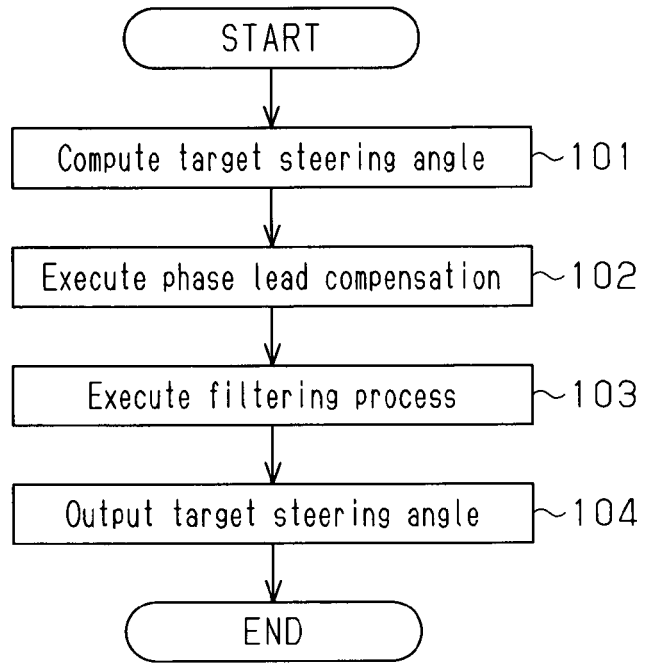
FIG. 3 is a flowchart showing a procedure for calculating a target steering angle in the EPS apparatus shown in FIG. 1.
Figure 4:
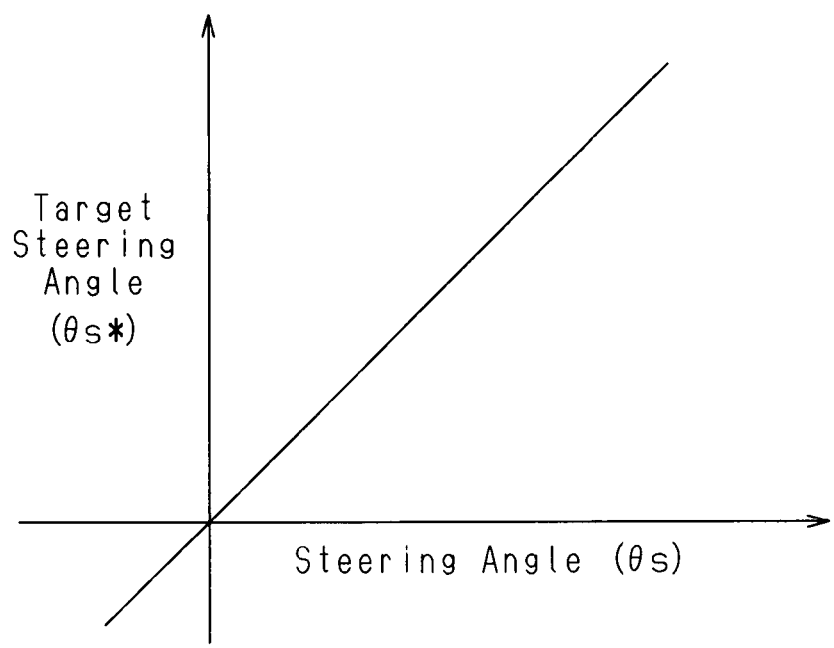
FIG. 4 is a graph showing the relationship between the steering angle and the target steering angle in the EPS apparatus shown in FIG. 1.
Figure 5:
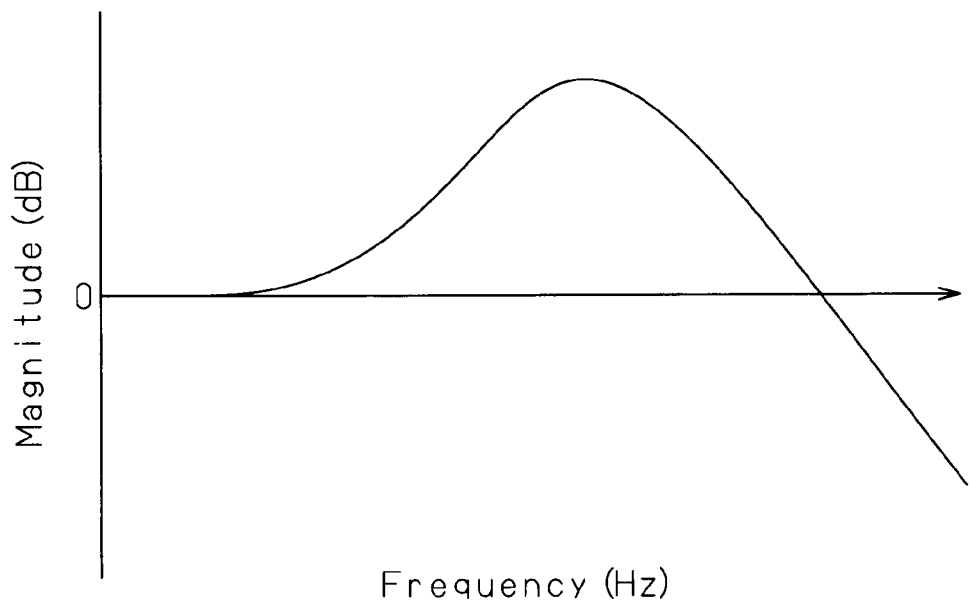
FIG. 5 provides graphs showing phase lead compensation executed in the EPS apparatus shown in FIG. 1.
Figure 5:
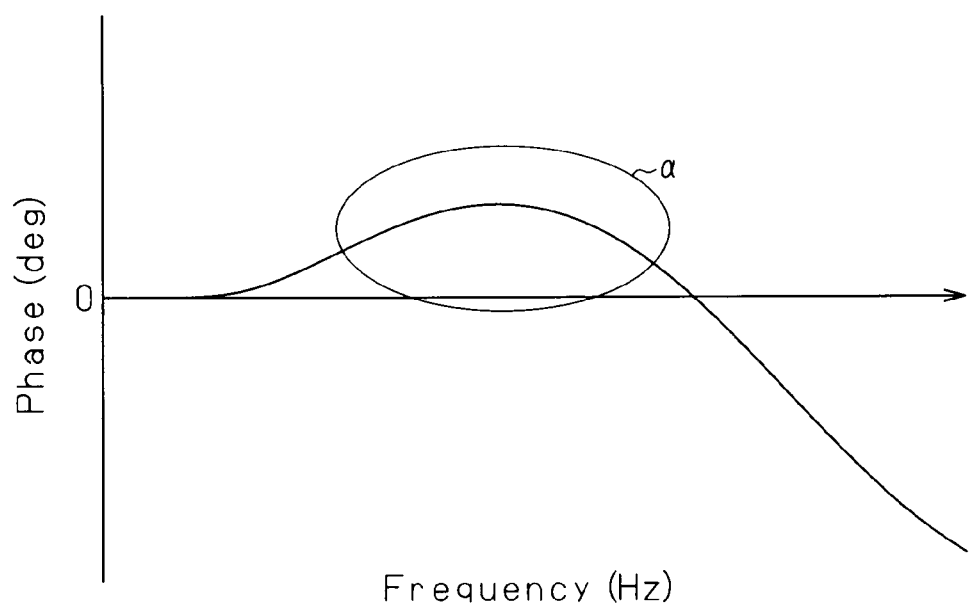

More specifically, a target steering angle computation section 53 included in the steering angle control section 52 executes the computation of the target steering angle θs* in accordance with the flowchart shown in FIG. 3.

First, at step 101, the target steering angle computation section 53 computes a target steering angle θs* that is proportionate to the steering angle θs detected by the steering angle sensor 29. At subsequent step 102, the target steering angle computation section 53 executes phase lead compensation to the computed target steering angle θs*. Specifically, the phase lead compensation is executed through filter computation having characteristics shown in FIG. 5. Accordingly, in the case where the steering wheel 2 is quickly operated as indicated by area a in FIG. 5, the target steering angle θs* is subjected to the phase lead compensation.

The EPS apparatus 1 directly transmits rotation of the motor 21 to the steering wheel 2, unlike a steer-by-wire type steering apparatus, in which a steering input system including a steering wheel and a steering drive system having a motor as a drive source are separately provided from each other, and a steering apparatus including a variable transmission ratio device that permits differential rotation between a steering wheel and a motor. Therefore, when rotation of the motor 21 lags behind rotation of the steering wheel 2 operated by the driver, the steering feel is immediately deteriorated. In this respect, the phase lead compensation is performed to the target steering angle θs* in the present embodiment, so that rotation of the motor 21 is prevented from lagging behind rotation of the steering wheel 2 due to the operation performed by the driver. As a result, the steering feel is prevented from being significantly deteriorated.

Subsequent to the phase lead compensation at step 102, the target steering angle computation section 53 executes a filtering process (low pass filtering process) to the target steering angle θs* at step 103. Thereafter, at step 104, the target steering angle computation section 53 outputs the target steering angle θs* that has been subjected to the filtering process.

As shown in FIG. 2, the target steering angle θs* output from the target steering angle computation section 53 is sent to a subtractor 54 together with the converted steering angle θcnv computed by the converted steering angle computation section 51. The subtractor 54 computes a deviation Δθs between the target steering angle θs* and the converted steering angle θcnv. Thereafter, the steering angle control section 52 executes feedback control based on the deviation Δθs at a feedback control section 55, thereby computing the steering angle control amount Ipo*. The computed steering angle control amount Ipo* is sent to a switching control section 56.

The steering torque determination section 49 has a function as abnormality detecting means (abnormality detecting section) that detects an abnormality in the steering torque sensor 28 based on the signals Sa, Sb sent from the steering torque sensor 28. The switching control section 56 receives a signal Str sent from the steering torque determination section 49, which signal Str is related to the presence or absence of any abnormality in the steering torque sensor 28. When the signal Str sent from the steering torque determination section 49 indicates that there is no abnormality in the steering torque sensor 28, the switching control section 56 outputs to the adder 50 the basic assist control amount Ias* sent from the basic assist control section 47. When the signal Str sent from the steering torque determination section 49 indicates that there is an abnormality in the steering torque sensor 28, the switching control section 56 outputs to the adder 50 the steering angle control amount Ipo* sent from the steering angle control section 52. Therefore, according to whether there is an abnormality in the steering torque sensor 28, one of the basic assist control amount Ias* and the steering angle control amount Ipo* functions as the basic component of the current command value Iq*, so that the manner in which the motor 21 is controlled is switched.

The present embodiment has the following advantages.

According to the present embodiment, even if the steering torque τ cannot be accurately detected due to an abnormality in the steering torque sensor 28, assist force that corresponds to rotation of the steering wheel 2 due to operation performed by of the driver is applied to the steering system. Therefore, even if an abnormality occurs in the steering torque sensor 28, the operation of the steering wheel 2 by the drive is continuously and stably assisted. The influence of disturbance such as changes in the road surface condition can be reduced by the feedback loop regarding the steering angle of the steering wheel 2.

According to the present embodiment, the phase lead compensation is performed to the target steering angle θs*, so that rotation of the motor 21 is prevented from lagging behind rotation of the steering wheel 2 due to the operation performed by the driver. As a result, the steering feel is prevented from being significantly deteriorated.

The above embodiment may be modified as follows.

The EPS actuator 22 is not limited to the column type, but may be a pinion type or a rack assist type.

In the above embodiment, the target steering angle computation section 53 computes the target steering angle θs* that is proportionate to the steering angle θs detected by the steering angle sensor 29. However, the proportional relation does not necessarily have to be established. For example, the detected steering angle θs may be used as the target steering angle θs* without change.

The computation of the steering angle control amount Ipo* by the steering angle control section 52 may include a deadband map computation in order to eliminate the influence of midpoint errors to the steering angle θs (the target steering angle θs*), the converted steering angle θcnv, and the deviation Δθs. Alternatively, the computation may include a stabilized filtering process for improving the stability of the feedback control.

For example, in the case of a vehicle having means for controlling the position of the steering wheel or the steerable wheels, such as a vehicle equipped with a automatic parking system, the position control means may be used as the steering angle control section 52.

What is claimed is:

1. An electric power steering apparatus comprising:
   a steering assist section that applies an assist force to a steering system to assist operation of a steering member, wherein the steering assist section is actuated by a drive source, the drive source being a motor;
   a steering torque sensor that detects steering torque input to the steering system;
   an abnormality detection section that detects abnormalities in the steering torque sensor;
   a steering angle sensor that detects a steering angle of the steering member;
   a rotational angle sensor that detects a rotational angle of the motor; and
   a control section that controls supply of drive power to the motor,
   wherein, when the abnormality detection section detects an abnormality in the steering torque sensor, the control section controls the supply of the drive power to the motor such that a converted steering angle, which is obtained by converting the rotational angle of the motor detected by the rotational angle sensor, follows a target steering angle, which is computed based on the steering angle detected by the steering angle sensor.

2. The apparatus according to claim 1, wherein the target steering angle is computed using phase lead compensation.

3. The apparatus according to claim 1, wherein the target steering angle is computed by subjecting a value based on the steering angle detected by the steering angle sensor to phase lead compensation.

4. The apparatus according to claim 1, wherein, when the abnormality detection section does not detect an abnormality in the steering torque sensor, the control section controls the supply of the drive power to the motor such that the motor generates a motor torque that corresponds to a target value of the assist force, the target value being computed based on the steering torque detected by the steering torque sensor.

5. The apparatus according to claim 4, wherein the target steering angle is computed using phase lead compensation.

6. The apparatus according to claim 4, wherein the target steering angle is computed by subjecting a value based on the steering angle detected by the steering angle sensor to phase lead compensation.

7. The apparatus according to claim 1, further comprising a current sensor that detects an actual current supplied to the motor.

8. The apparatus according to claim 7, wherein the control section generates a motor control signal based on the actual current supplied to the motor and the rotational angle of the motor.

* * * * *